United States Patent
Trim et al.

(10) Patent No.: US 10,971,134 B2
(45) Date of Patent: Apr. 6, 2021

(54) COGNITIVE MODIFICATION OF SPEECH FOR TEXT-TO-SPEECH

(71) Applicant: INTERNATIONAL BUSINESS MACHINES CORPORATION, Armonk, NY (US)

(72) Inventors: Craig M. Trim, Ventura, CA (US); John M. Ganci, Jr., Raleigh, NC (US); Aaron K. Baughman, Silver Spring, MD (US); Veronica Wyatt, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 16/176,386

(22) Filed: Oct. 31, 2018

(65) Prior Publication Data
US 2020/0135173 A1 Apr. 30, 2020

(51) Int. Cl.
*G10L 13/00* (2006.01)
*G10L 13/08* (2013.01)
*G10L 15/14* (2006.01)

(52) U.S. Cl.
CPC ............ *G10L 13/08* (2013.01); *G10L 15/142* (2013.01)

(58) Field of Classification Search
None
See application file for complete search history.

(56) References Cited

U.S. PATENT DOCUMENTS

| 8,442,821 | B1 | 5/2013 | Vanhoucke | |
|---|---|---|---|---|
| 8,527,274 | B2 * | 9/2013 | Freeman | G06Q 30/0251 704/257 |
| 8,670,984 | B2 * | 3/2014 | Dow | G10L 13/033 704/258 |
| 9,703,764 | B2 * | 7/2017 | Flores | G06F 40/205 |
| 9,799,324 | B2 * | 10/2017 | Sharifi | G06F 40/289 |
| 9,818,432 | B2 * | 11/2017 | Li | G10L 21/10 |
| 10,013,492 | B1 * | 7/2018 | Petts | G06Q 30/0201 |
| 10,453,477 | B2 * | 10/2019 | Li | G10L 21/10 |

(Continued)

FOREIGN PATENT DOCUMENTS

WO 2007149220 12/2007

OTHER PUBLICATIONS

Mell et al., "The NIST Definition of Cloud Computing", NIST, Special Publication 800-145, Sep. 2011, 7 pages.

*Primary Examiner* — Satwant K Singh
(74) *Attorney, Agent, or Firm* — James Nock; Andrew D. Wright; Roberts Calderon Safran & Cole, P.C.

(57) ABSTRACT

A computer-implemented method comprising: receiving, by a computing device, an input phrase from a text generator; determining, by the computing device, a complexity level for an audience; generating, by the computing device, a plurality of target phrases including a modification of the input phrase; generating, by the computing device, respective readability scores for each of the plurality of target phrases; mapping, by the computing device, the plurality of the target phrases to the target audience complexity level to select a particular target phrase of the plurality of the target phrases; and outputting, by the computing device, the selected particular target phrase to a text-to-speech (T2S) component to cause the T2S component to output the selected particular target phrase as audible speech.

20 Claims, 7 Drawing Sheets

(56) References Cited

U.S. PATENT DOCUMENTS

2013/0080173 A1\* 3/2013 Talwar ................. G10L 13/033
 704/260
2019/0258676 A1\* 8/2019 Sherrard ........... G06F 16/90332

\* cited by examiner

COGNITIVE MODIFICATION OF SPEECH FOR TEXT-TO-SPEECH

BACKGROUND

The present invention generally relates to text-to-speech modification and, more particularly, to cognitive text-to-speech modification based on target audience complexity level.

Dialog systems may include a text-to-speech (T2S) component whereby the text generated by the system is spoken back to the user (e.g. in some cases a digital assistant application performs this function). The component that performs T2S may be functionally different from the rest of the system. For example, the T2S component and/or algorithm may be designed by a completely different team, company or other entity and made available as a library for use. In this manner, the T2S component takes text as an input and returns audible speech as an output. As an example, the T2S component may receive text from a digital assistant application for reading the text aloud to the user.

SUMMARY

In an aspect of the invention, a computer-implemented method includes: receiving, by a computing device, an input phrase from a text generator; determining, by the computing device, a complexity level for an audience; generating, by the computing device, a plurality of target phrases including a modification of the input phrase; generating, by the computing device, respective readability scores for each of the plurality of target phrases; mapping, by the computing device, the plurality of the target phrases to the target audience complexity level to select a particular target phrase of the plurality of the target phrases; and outputting, by the computing device, the selected particular target phrase to a text-to-speech (T2S) component to cause the T2S component to output the selected particular target phrase as audible speech.

In an aspect of the invention, there is a computer program product comprising a computer readable storage medium having program instructions embodied therewith. The program instructions are executable by a user device to cause the user device to: receive an input phrase from a text generator implemented within the user device; determine a complexity level for an audience; generate a plurality of target phrases including a modification of the input phrase; generate respective readability scores for each of the plurality of target phrases; map the plurality of the target phrases to the target audience complexity level to select a particular target phrase of the plurality of the target phrases; and output the selected particular target phrase to a text-to-speech (T2S) component implemented within the user device to cause the T2S component to output the selected particular target phrase as audible speech.

In an aspect of the invention, a system includes: a processor, a computer readable memory and a computer readable storage medium associated with a remote server external to a user device; program instructions to receive an input phrase from a text generator implemented within the user device; program instructions to determine a complexity level for an audience; program instructions to generate a plurality of target phrases including a modification of the input phrase; program instructions to generate respective readability scores for each of the plurality of target phrases; program instructions to map the plurality of the target phrases to the target audience complexity level to select a particular target phrase of the plurality of the target phrases; and program instructions to output the selected particular target phrase to a text-to-speech (T2S) component implemented within the user device to cause the T2S component to output the selected particular target phrase as audible speech. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to text-to-speech modification and, more particularly, to cognitive text-to-speech modification based on target audience complexity level. A text-to-speech (T2S) component can be implemented in a user device, such as a smartphone, tablet device, laptop/desktop computing device, etc. to present text in the form of audible speech. As an example, the T2S component may receive text from a text generator, such as a digital assistant application, for reading the text aloud to the user (e.g., text relating to information requested by the user, text regarding operations performed by the digital assistant application, etc.).

This orthogonal approach may be problematic in that the text sent to the T2S component may have a complexity that is too high for the user or target audience. For example, a target audience may be younger users in which the T2S component receives text to present as speech from a text generator that is associated with an educational application. As another example, the target audience may be an adult driving a vehicle in which the T2S component receives text to present as speech from a vehicle navigation or infotainment system. Accordingly, aspects of the present invention include an intermediary component between the text generator (e.g., a digital assistant, an application, a navigation system, etc.) and the T2S component and allow the text to be modified (e.g., simplified or made more sophisticated) for the end user. As described herein, simplification is more than merely using "easier words." Instead, simplification, in accordance with aspects of the present invention, involves taking speech into consideration in forming utterances that have a characteristic of being easier to understand in an automated agent spoken environment.

As described herein, an intermediary device, in accordance with aspects of the present invention, receives a textual set of words from a text generator as input, and then uses any suitable model (e.g., a Hidden Markov Model (HMM) and/or other type of mode) to find/predict the most likely next sequence of words to generate a set of target phrases. Each generated target phase generated is then ranked/scored for readability. Aspects of the present invention map the scored target phrases for the appropriate target audience complexity level, select the target phrase by mapping the scores to the target audience complexity level, and output the selected target phrase to the T2S component for presenting the selected target phrase in the form of audible speech. In this way aspects of the present invention determine and present an alternate/simplified manner of stating an input phrase by a T2S component in which the input phrase is received from a text generator. The simplified phrase is determined appropriately for the target audience level context and complexity. Advantageously, speech presented by a T2S component is modified and simplified for its target audience. Additionally, or alternatively, the speech may be made more complex, descriptive, and/or sophisticated for another target audience. Also, in one illustrative example, aspects of the present invention may determine that input text from a text generator is already appropriate for its target audience, and will not modify the text in this situation.

In one example embodiment, functions of the intermediary device to determine complexity level and modify input text from a text generator are implemented within a user device having the text generator and T2S component. In another example embodiment, functions of the intermediary device are implemented externally to the user device as a cloud service in which the text generator from the user device provides input text to a cloud-based server, and the cloud-based server determines the complexity level of the target audience, modifies the input text, and returns the modifies input text back to the T2S component of the user device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
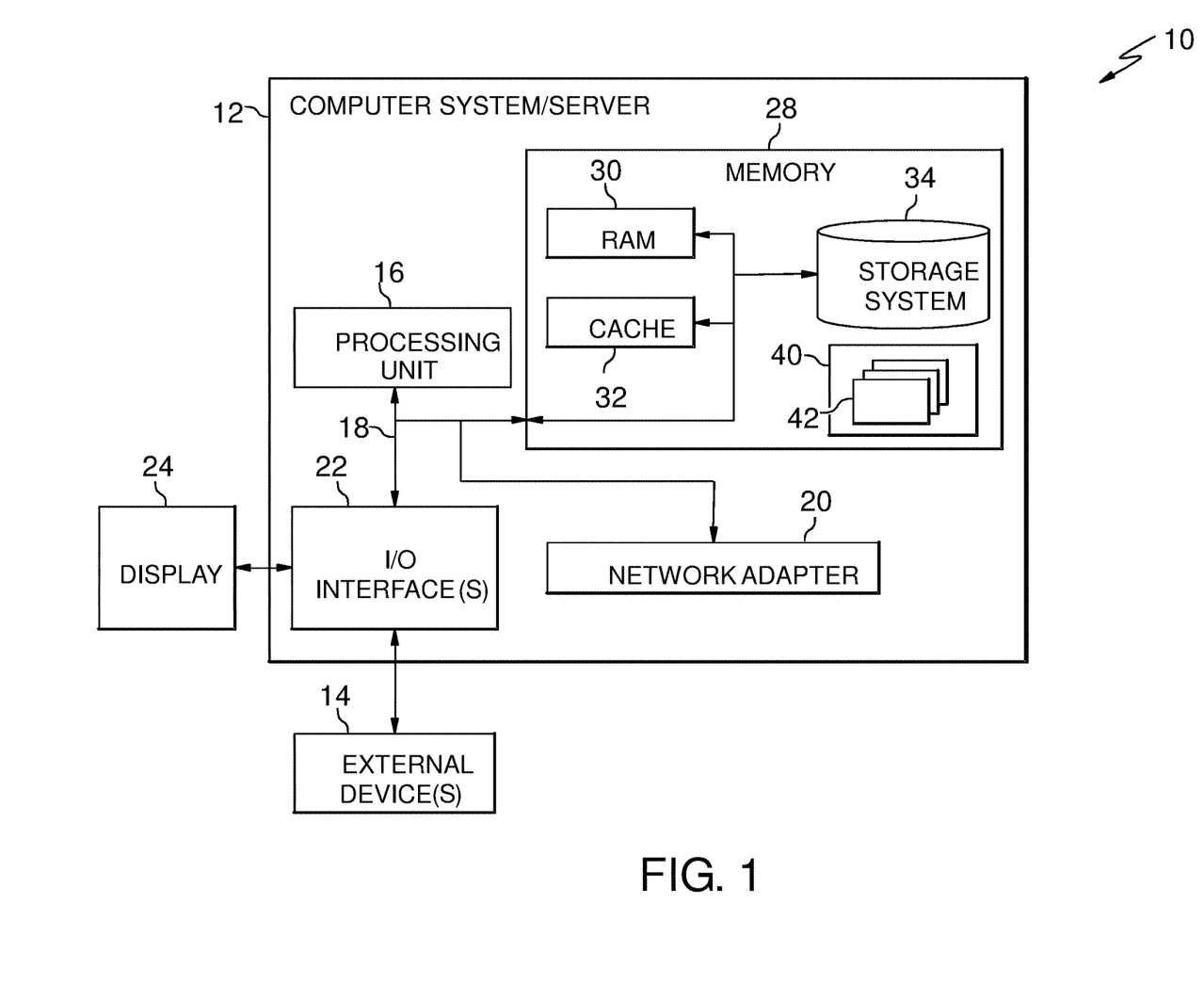
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
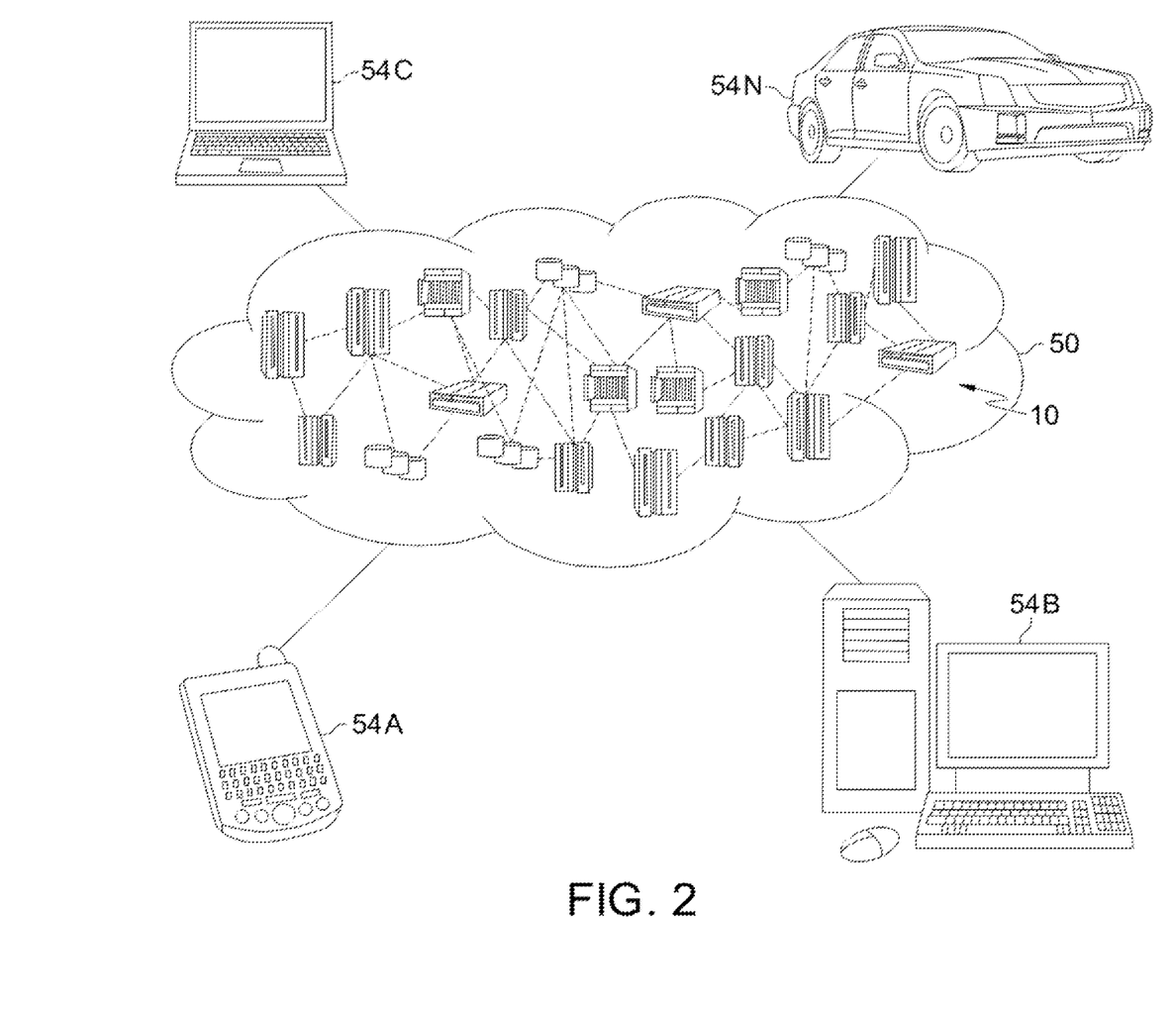
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
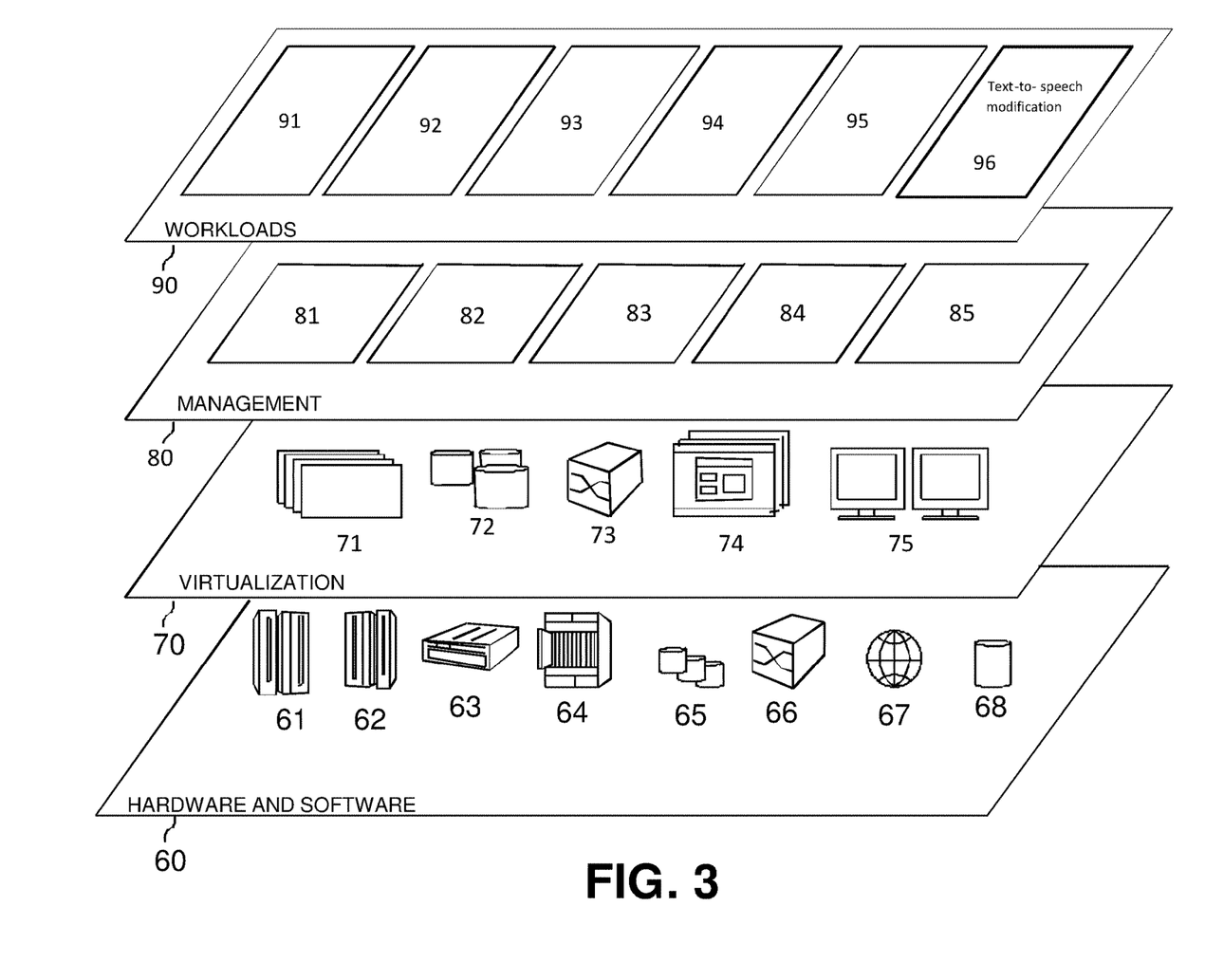
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and text-to-speech modification 96.

Referring back to FIG. 1, the program/utility 40 may include one or more program modules 42 that generally carry out the functions and/or methodologies of embodiments of the invention as described herein (e.g., such as the functionality provided by text-to-speech modification 96). Specifically, the program modules 42 may receive an input phrase from a text generator, determine a target audience and context complexity level, determine target phrases, determine readability scores of the target phrases, select the target phrase for the target audience complexity level, and output the selected target phrase to a T2S component. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a cognitive T2S modification device as shown in FIG. 4.

Figure 4:
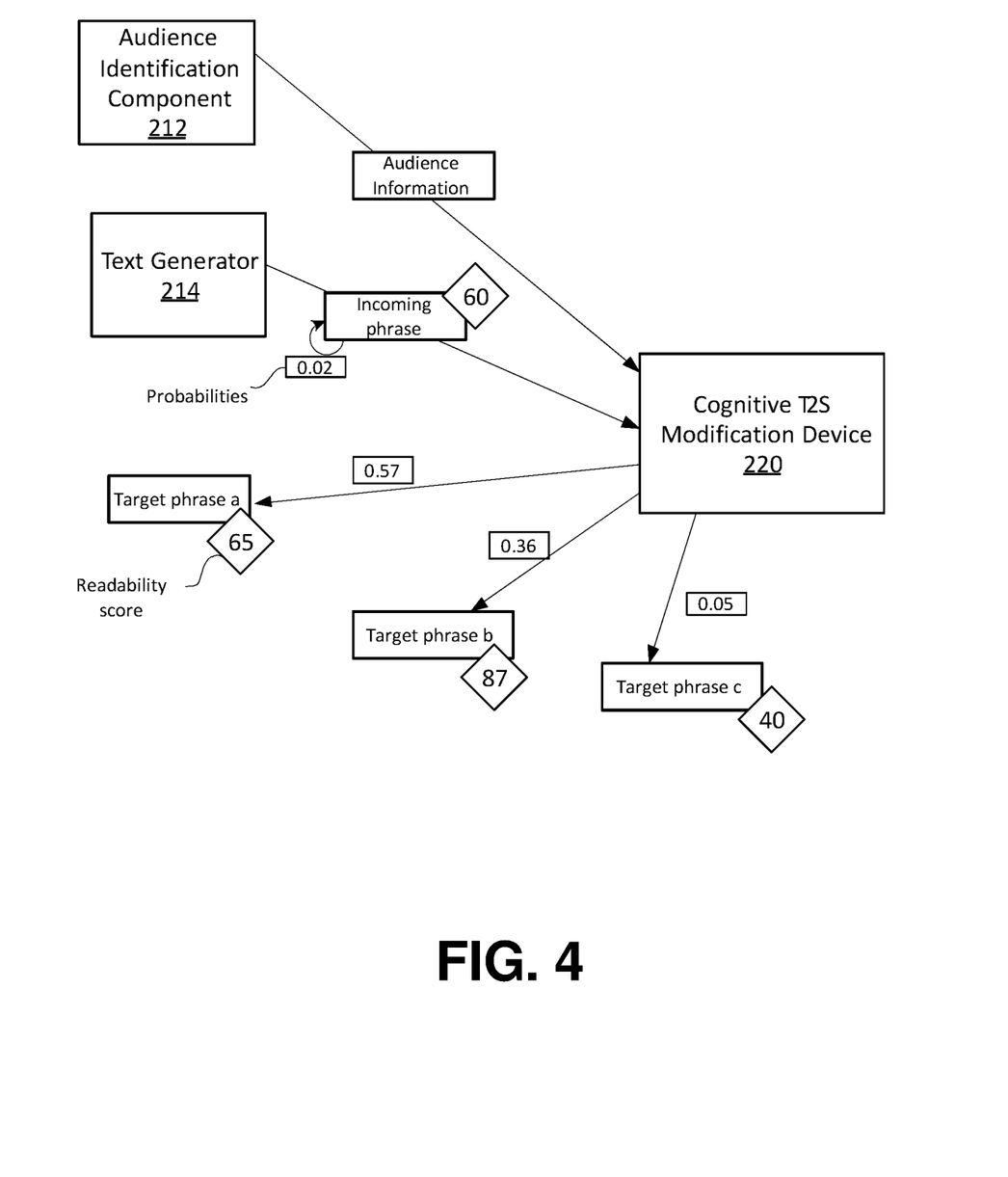
FIG. 4 shows an overview of an example implementation in accordance with aspects of the present invention.

FIG. 4 shows an overview of an example implementation in accordance with aspects of the present invention. As shown in FIG. 4, a cognitive T2S modification device 220 receives an incoming phrase from a text generator 214. As an illustrative example, the incoming phrase may be a response provided by a digital assistant application, although the incoming phrase may be any other phrase from another source (e.g., a text document, webpage, e-mail, text message, etc.).

In embodiments, the cognitive T2S modification device 220 also receives audience information from an audience identification component 212. Based on the audience information, the cognitive T2S modification device 220 determines a complexity level and a corresponding level to which the cognitive T2S modification device 220 should simplify the incoming phrase. More specifically, the cognitive T2S modification device 220 generates one or more target phrases from the incoming phrase in which each target phrase is a modified version of the incoming phrase. In embodiments, the cognitive T2S modification device 220 generates each target phrase using, for example, a Hidden Markov Model (HMM) to find the most likely next sequence of words. Additionally, or alternatively, the cognitive T2S modification device 220 generates target phrases using any other type of suitable model. In the example shown in FIG. 4, an HMM is used and the probabilities of each target phrase being a "valid state" (or a valid phrase) are shown. For example, the respective probabilities of target phrase a, target phrase b, target phrase c, and the incoming phrase being a valid phrase are 57%, 36%, 5%, and 2%.

In embodiments, each generated target phase is scored for readability by the cognitive T2S modification device 220. In embodiments, Flesch-Kincaid scoring technique and/or other suitable readability scoring technique is used to score the target phrases for readability. In example embodiment, the scores are on a scale (e.g. from 0-100) in which phrases with higher scores are considered more complex. In another example embodiment, the scores are on a scale (e.g. from 0-100) in which phrases with lower scores are considered more complex.

In embodiments, the cognitive T2S modification device 220 maps the scored target phrases for the appropriate target audience complexity level. For example, in embodiments, the cognitive T2S modification device 220 determines, based on the probability of each target phrase being a valid phrase and based on the readability score of each target phrase, which target phrase to select for the appropriate audience complexity level. In the example shown in FIG. 4, "target phrase a" and "target phrase b" will be considered as the probabilities of these target phrases are within a threshold difference (e.g., 0.21 difference). As an illustrative example, if the complexity level (as determined by the audience information) corresponds to a readability score from 50-69, "target phrase a" is selected, and is output to a T2S component so that the text that is read aloud is more appropriate for the audience. As another example, if the complexity level (as determined by the audience information) corresponds to a readability score from 70-89, "target phrase b" is selected since "target phrase b" is one of the target phrases in consideration and has a readability score that more closely matches that of the audience level. In this way, audio is modified using a target phrase that has a high probability of being valid and also has a complexity level suitable for the audience.

Figure 5:
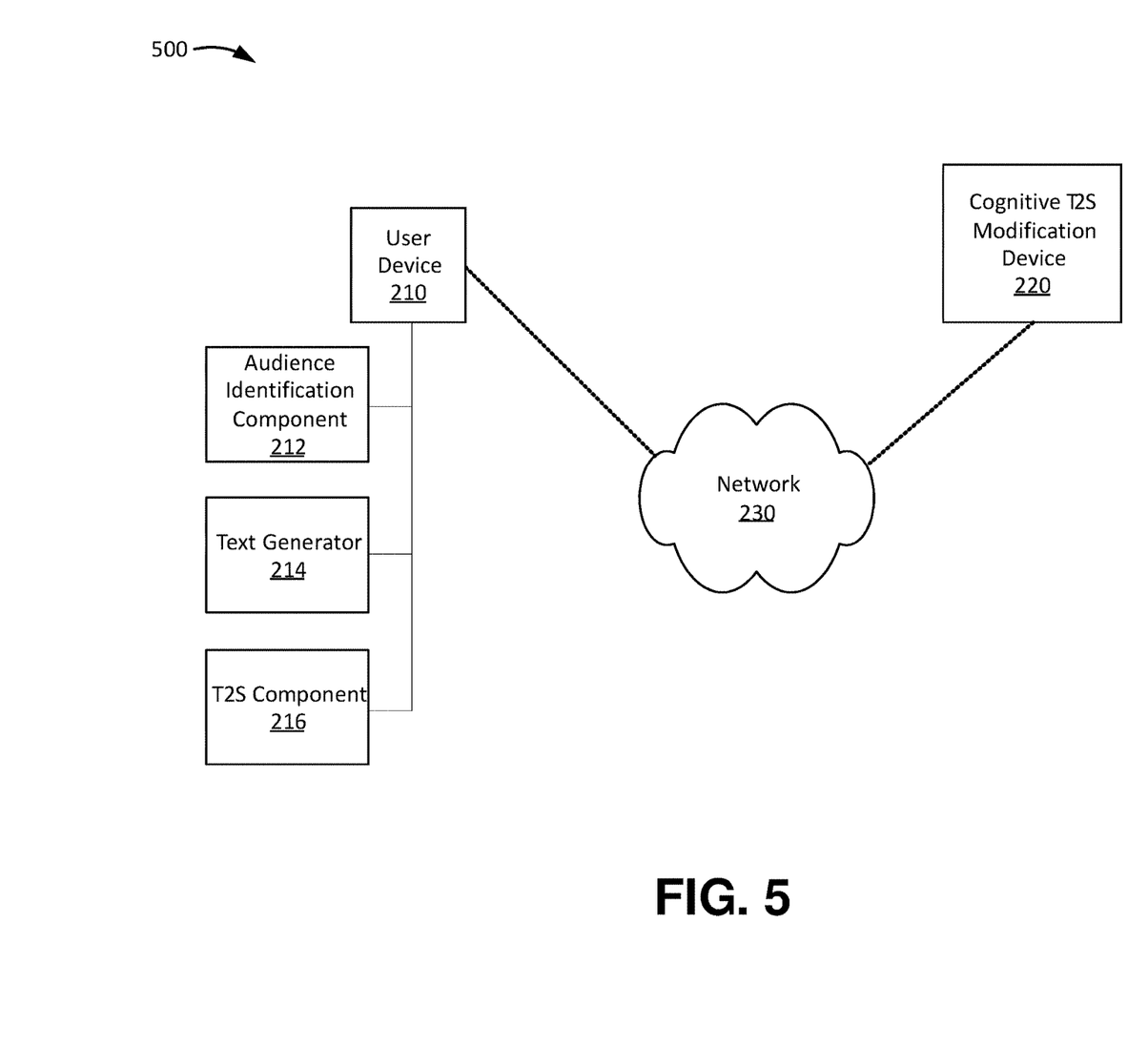
FIG. 5 shows an example environment in accordance with aspects of the present invention.

FIG. 5 shows an example environment in accordance with aspects of the present invention. As shown in FIG. 5, environment 500 includes a user device 210, a cognitive T2S modification device 220, and a network 230. In embodiments, one or more components in environment 500 may correspond to one or more components in the cloud computing environment of FIG. 2. In embodiments, one or more components in environment 500 may include the components of computer system/server 12 of FIG. 1.

The user device 210 includes a computing device capable of communicating via a network, such as the network 230. In example embodiments, the user device 210 corresponds to a mobile communication device (e.g., a smart phone or a personal digital assistant (PDA)), a portable computer device (e.g., a laptop or a tablet computer), a desktop computer, a vehicle navigation/infotainment system, a smart television, a kiosk, and/or another type of computing device.

In embodiments, the user device 210 includes an audience identification component 212, a text generator 214, and a T2S component 216. The audience identification component 212 identifies an audience using the user device 210 (e.g., a single user or group of users). In embodiments, the audience identification component 212 identifies the audience using any suitable user identification techniques (e.g., user profile information, fingerprint/biometrics information, username/password, voice recognition, facial recognition, etc.). In embodiments, the audience identification component 212 provides audience information and/or audience profile information (including audience complexity level information) to the cognitive T2S modification device 220. In embodiments, the audience identification component 212 maintains a user profile that identifies simplification range thresholds. A simplification range identifies a range of readability scores for which an input phrase (from the text generator 214) should be simplified (or made more complex). Also, in embodiments, the user profile indicates different simplification ranges for different contexts (e.g., more simplification when the user is driving).

The text generator 214 includes a component that generates text to be read aloud by the T2S component 216 (e.g., after being modified by the cognitive T2S modification device 220). In embodiments, the text generator 214 generates text from an application running on the user device 210 or a file (e.g., a word processing application, a digital assistant application, a gaming application, an educational application, text file, e-mail, etc.). The T2S component 216 reads aloud text originating from the text generator 214 and modified by the cognitive T2S modification device 220.

The cognitive T2S modification device 220 includes one or more computing devices (e.g., such as computer system/server 12 of FIG. 1) that receives audience information from the audience identification component 212 and text from the text generator 214. As described herein, the cognitive T2S modification device 220 modifies the text based on audience complexity level information. More specifically, the cognitive T2S modification device 220 generates target phrases using an HMM and/or other suitable model and selects a particular target phrase to output to the T2S component 216 based on the audience complexity level information and the probability of target phrase validity. In embodiments, the cognitive T2S modification device 220 take into consideration the user's activity on the user device 210 and/or other contextual information to identify the audience and complexity level information. For example, the cognitive T2S modification device 220 identifies that the audience is an adult driving a vehicle based on the type of user device 210 from which input text is received, or that the audience is a user having a different complexity level based on the type of application (e.g., an early educational application) from which input text is received.

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. For example, in embodiments, operations of the cognitive T2S modification device 220 are integrated within the user device 210. Devices of the environment 500 may interconnect via wired connections, wireless connections, or a combination of wired and wireless connections.

Figure 6:
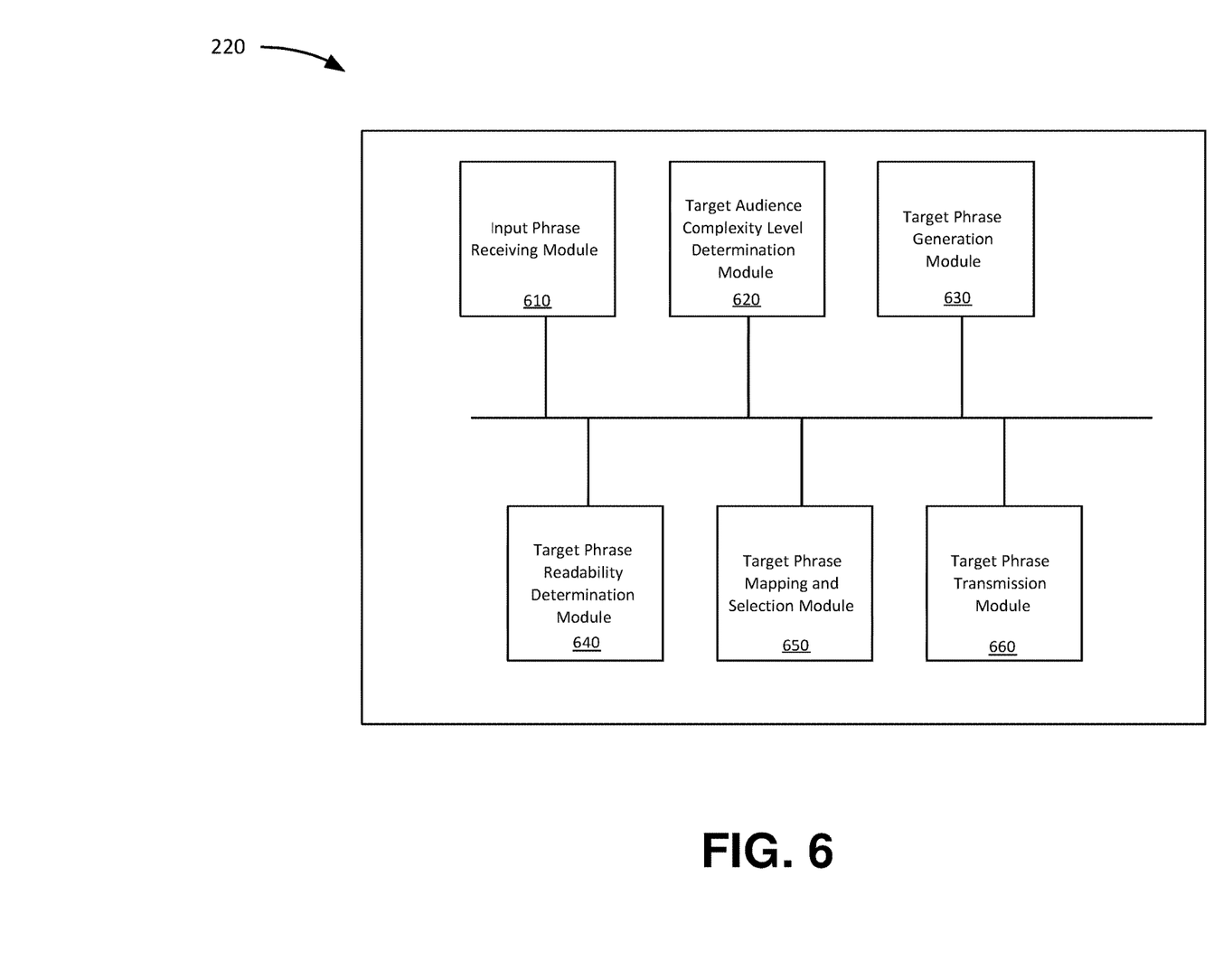
FIG. 6 shows a block diagram of example components of a cognitive T2S modification device in accordance with aspects of the present invention.

FIG. 6 shows a block diagram of example components of a cognitive T2S modification device 220 in accordance with aspects of the present invention. As shown in FIG. 6, the cognitive T2S modification device 220 includes an input phrase receiving module 610, a target audience complexity level determination module 620, a target phrase generation module 630, a target phrase readability determination module 640, a target phrase mapping and selection module 650, and a target phrase transmission module 660. In embodiments, the cognitive T2S modification device 220 may include additional or fewer components than those shown in FIG. 6. In embodiments, separate components may be integrated into a single computing component or module. Additionally, or alternatively, a single component may be implemented as multiple computing components or modules.

The input phrase receiving module 610 includes a program module (e.g., program module 42 of FIG. 1) that receives an input phrase from the text generator 214. As described herein, the input phrase may be associated with a word processing application, a digital assistant application, a gaming application, an educational application, text file, e-mail, etc.

The target audience complexity level determination module 620 includes a program module (e.g., program module 42 of FIG. 1) that determines a target audience (e.g., based on information received from the audience identification component 212). In embodiments, the target audience complexity level determination module 620 determines the target audience from user identification information from the audience identification component 212. In embodiments, the target audience complexity level determination module 620 determines that the target audience is a group of users based on information from the audience identification component 212 that multiple users are using the user device 210. In embodiments, the target audience complexity level determination module 620 determines that the target audience is a group of users based on camera and/or sensor information from the user device 210 indicating that multiple users are viewing and/or using the user device 210. In embodiments, the target audience complexity level determination module 620 determines a complexity level for the audience based on information the user profile(s) of the user(s) of the user device 210. Additionally, or alternatively, the target audience complexity level determination module 620 determines the complexity level based on user activity and/or the origin of an application from which the input phrase is received. For example, the target audience complexity level determination module 620 determines one complexity level for when the user is driving (e.g., when the input phrase is received from a vehicle navigation/infotainment system) and another complexity level for when the user is in their home/office. In embodiments, when the audience includes a group of users, the target audience complexity level determination module 620 determines the complexity level for the audience based on the "lowest common denominator" (e.g., the lowest complexity level of all users in the group).

The target phrase generation module 630 includes a program module (e.g., program module 42 of FIG. 1) that generates target phrases by modifying the input phrase received by the input phrase receiving module 610. As described herein, the target phrase generation module 630 generates target phrases using an HMM and/or other suitable model to find/predict the most likely next sequence of words from within the input phrase. In embodiments, in which the HMM is used, each target phrase is considered a possible output in the HMM. In embodiments, the target phrase generation module 630 determines a probability that each target phrase or output is considered "valid" (e.g., has a similar meaning and information as the input phrase).

The target phrase readability determination module 640 includes a program module (e.g., program module 42 of FIG. 1) that generates readability of each target phrase generated by the target phrase generation module 630. In embodiments, the target phrase readability determination module 640 generates readability scores (e.g. on a scale from 0-100) in which phrases with higher scores are considered more complex. In embodiments, the target phrase readability determination module 640 generates the readability scores using a Flesch-Kincaid scoring technique and/or other suitable readability scoring technique.

The target phrase mapping and selection module 650 includes a program module (e.g., program module 42 of FIG. 1) that maps the target phrases (e.g., generated by the target phrase generation module 630) with the audience complex level (e.g., determined by the target audience complexity level determination module 620). In embodiments, the target phrase mapping and selection module 650 selects the target phrase that most closely matches the audience target level and has a threshold probability of validity.

The target phrase transmission module 660 includes a program module (e.g., program module 42 of FIG. 1) that transmits or outputs the selected target phrase (e.g., selected by the target phrase mapping and selection module 650). In embodiments, the target phrase transmission module 660 outputs the selected target phrase to the T2S component 216. In this way, the T2S component 216 outputs, as audible speech via an audio speaker of the user device 210, a modified version of the input phrase (e.g., a simplified version or a more sophisticated and descriptive version) based on the audience complexity level.

Figure 7:
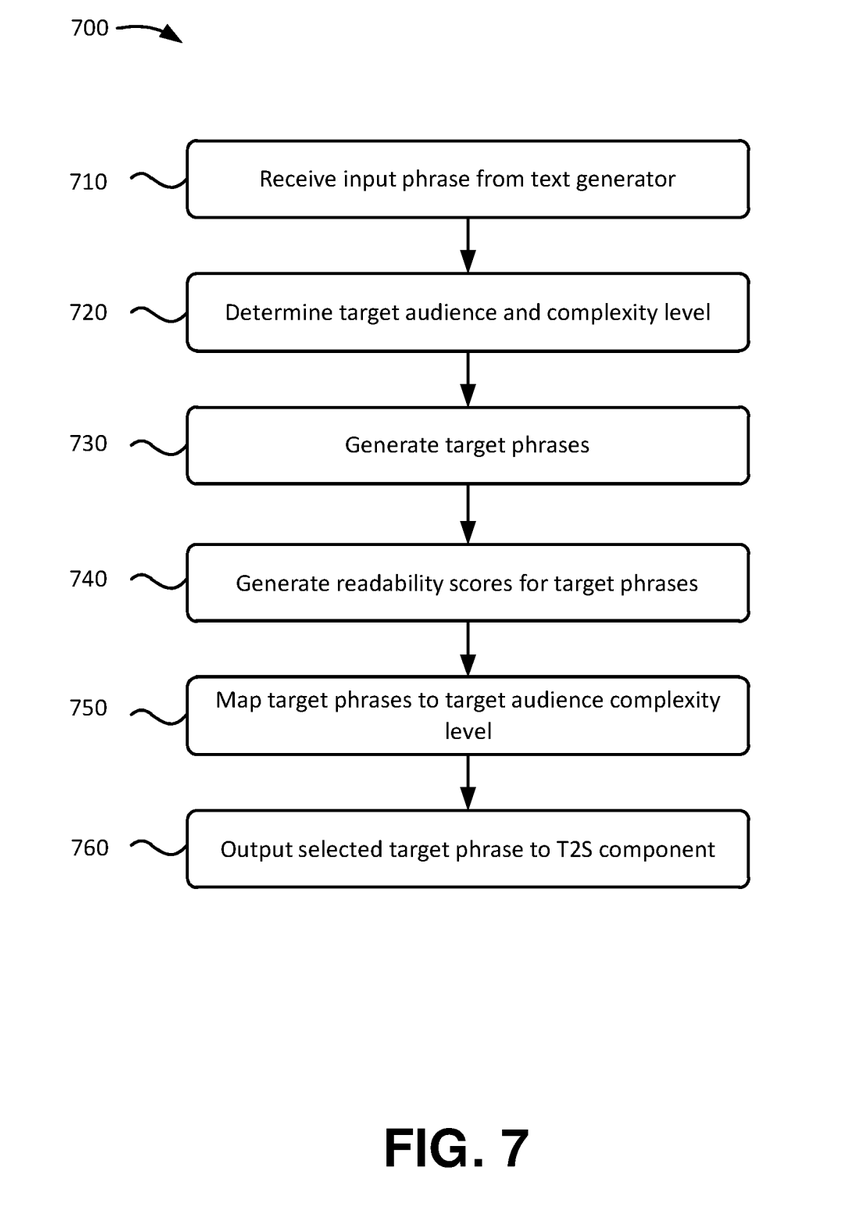
FIG. 7 shows an example flowchart of a process for modifying an input phrase originating from a speech generator for audible presentation by a T2S component in accordance with aspects of the present invention.

FIG. 7 shows an example flowchart of a process for modifying an input phrase originating from a speech generator for audible presentation by a T2S component. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 includes receiving an input phrase from a text generator (step 710). For example, as described above with respect to the input phrase receiving module 610, the cognitive T2S modification device 220 receives an input phrase from the text generator 214. As described herein, the input phrase may be associated with a word processing application, a digital assistant application, a gaming application, an educational application, text file, e-mail, etc.

Process 700 also includes determining a target audience and complexity level (step 720). For example, as described above with respect to the target audience complexity level determination module 620, the cognitive T2S modification device 220 determines the target audience from user identification information from the audience identification component 212. Further, the cognitive T2S modification device 220 determines a complexity level for the audience based on information the user profile(s) of the user(s) of the user device 210. Additionally, or alternatively, the target audience complexity level determination module 620 determines the complexity level based on user activity and/or the origin of an application from which the input phrase is received.

Process 700 further includes generating target phrases (step 730). For example, as described above with respect to the target phrase generation module 630, the cognitive T2S modification device 220 generates target phrases by modifying the input phrase (e.g., received at step 710). As described herein, the target phrase generation module 630 generates target phrases using an HMM and/or other suitable model to find/predict the most likely next sequence of words from within the input phrase. In embodiments, the target phrase generation module 630 determines a probability that each target phrase or output is considered "valid" (e.g., has a similar meaning and information as the input phrase).

Process 700 also includes generating readability scores for the target phrases (step 740). For example, as described above with respect to the target phrase readability determination module 640, the cognitive T2S modification device 220 determines readability of each target phrase (e.g., generated at step 730). In embodiments, the target phrase readability determination module 640 generates readability scores (e.g. on a scale from 0-100) in which phrases with higher scores are considered more complex. In embodiments, the target phrase readability determination module 640 generates the readability scores using a Flesch-Kincaid scoring technique and/or other suitable readability scoring technique.

Process 700 further includes mapping the target phrases for the target (step 750). For example, as described above with respect to the target phrase mapping and selection module 650, the cognitive T2S modification device 220 maps the target phrases (e.g., generated at step 730) with the audience complex level (e.g., determined at step 720). In embodiments, the cognitive T2S modification device 220 selects the target phrase that most closely matches the audience target level and has a threshold probability of validity.

Process 700 also includes outputting the selected target phrase to a T2S component (step 760). For example, as described above with respect to the target phrase transmission module 660, the cognitive T2S modification device 220 transmits or outputs the selected target phrase (e.g., selected by the target phrase mapping and selection module 650). In embodiments, the target phrase transmission module 660 outputs the selected target phrase to the T2S component 216. In this way, the T2S component 216 outputs, as audible speech, a modified version of the input phrase (e.g., a simplified version or a more sophisticated and descriptive version) based on the audience complexity level.

As described herein, aspects of the present invention provide a technique for modifying text to speech based upon a target audience. For example, aspects of the present invention identify text (generally from speech to text) similar to what is described at step 710; determine a target audience of the identified text and the age, education, sophistication, etc. of the target audience (e.g., as described at step 720); predict a phrase that could replace a phrase of text based upon Hidden Markov Models and a Flesh-Kincaid score or identifying a simpler phrase to replace a more complex phrase (e.g., in a similar manner as described at step 730); determining a readability score for the phrase (e.g., in a similar manner as described at step 740); evaluating the identified user and context simplification level and map the scored target phrase of the appropriate range for the target audience level and context (e.g., in a similar manner as described at step 750); and mapping target phrase for the appropriate target audience context level to the text to speech system (e.g., in a similar manner as described at step 750).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, an input phrase from a text generator;
determining, by the computing device, a complexity level for an audience;
generating, by the computing device, a plurality of target phrases including a modification of the input phrase, wherein the generating comprises utilizing a Hidden Markov Model (HMM) to predict a most likely next sequence of words from within the input phrase;
generating, by the computing device, respective readability scores for each of the plurality of target phrases;
mapping, by the computing device, the plurality of the target phrases to the target audience complexity level to select a particular target phrase of the plurality of the target phrases; and
outputting, by the computing device, the selected particular target phrase to a text-to-speech (T2S) component to cause the T2S component to output the selected particular target phrase as audible speech.

2. The computer-implemented method of claim 1, wherein the text generator and the T2S component are implemented within a user device.

3. The computer-implemented method of claim 1, wherein the complexity level is determined based on a user profile associated with user identification information, wherein the user identification information is at least one selected from the group consisting of:
user name and password,
biometrics information,
facial recognition, and
voice recognition.

4. The computer-implemented method of claim 1, wherein the complexity level is determined based on user device activity.

5. The computer-implemented method of claim 1, wherein the complexity level is a lowest complexity level of respective complexity levels for each user in a group of users.

6. The computer-implemented method of claim 1, wherein the respective readability scores are generated using a Flesch-Kincaid scoring technique.

7. The computer-implemented method of claim 1, wherein the input phrase originates from at least one selected from the group consisting of:
an application;
a digital assistant;
a text file;
an e-mail message;
a text message, and
a webpage.

8. The computer-implemented method of claim 1, wherein the particular target phrase is selected based on a probability of validity satisfying a threshold.

9. The computer-implemented method of claim 1, wherein a service provider at least one of creates, maintains, deploys and supports the computing device.

10. The computer-implemented method of claim 1, wherein the receiving the input phrase, the determining the complexity level, the generating the plurality of target phrases, the generating the respective readability scores, the mapping the plurality of target phrases, and the outputting the selected target phrase are provided by a service provider on a subscription, advertising, and/or fee basis.

11. The computer-implemented method of claim 1, wherein the computing device includes software provided as a service in a cloud environment.

12. The computer-implemented method of claim 1, further comprising deploying a system, wherein the deploying the system comprises providing a computer infrastructure operable to perform the receiving the input phrase, the determining the complexity level, the generating the plurality of target phrases, the generating the respective readability scores, the mapping the plurality of target phrases, and the outputting the selected target phrase.

13. The method of claim 1, further comprising identifying the audience as a group of users based on camera or sensor data of the user device indicating that multiple users are utilizing the user device, wherein the determining the complexity level for the audience comprises determining respective levels of complexity for each user of the group of users, and selecting a lowest complexity level from the respective complexity levels of each user of the group of users as the complexity level for the audience.

14. A computer program product comprising a computer readable storage medium having program instructions embodied therewith, the program instructions executable by a user device to cause the user device to:
receive an input phrase from a text generator implemented within the user device;
determine a complexity level for an audience;
generate a plurality of target phrases including a modification of the input phrase wherein the generating comprises utilizing a Hidden Markov Model (HMM) to predict a most likely next sequence of words from within the input phrase;
determine that each of the plurality of target phrases meets a target threshold of validity;
generate respective readability scores for each of the plurality of target phrases;
map the plurality of the target phrases to the target audience complexity level to select a particular target phrase of the plurality of the target phrases; and
output the selected particular target phrase to a text-to-speech (T2S) component implemented within the user device to cause the T2S component to output the selected particular target phrase as audible speech.

15. The computer program product of claim 14, wherein the complexity level is determined based on an origin of an application from which the input phrase is received.

16. The computer program product of claim 14, wherein the respective readability scores are generated using a Flesch-Kincaid scoring technique.

17. The computer program product of claim 14, wherein the input phrase originates from at least one selected from the group consisting of:
an application;
a digital assistant;
a text file;
an e-mail message;
a text message, and
a webpage.

18. The computer program product of claim 14, wherein the program instructions are further executable by the user device to cause the user device to identify the audience as a group of users based on camera or sensor data of the user device indicating that multiple users are utilizing the user device, wherein the determining the complexity level for the audience comprises determining respective levels of complexity for each user of the group of users, and selecting a lowest complexity level from the respective complexity levels of each user of the group of users as the complexity level for the audience.

19. A system comprising:
a processor, a computer readable memory and a computer readable storage medium associated with a remote server external to a user device;
program instructions to receive an input phrase from a text generator implemented within the user device;
program instructions to determine a complexity level for an audience;
program instructions to generate a plurality of target phrases including a modification of the input phrase, wherein the generating comprises utilizing a model to predict a most likely next sequence of words from within the input phrase;
program instructions to generate respective readability scores for each of the plurality of target phrases;
program instructions to map the plurality of the target phrases to the target audience complexity level to select a particular target phrase of the plurality of the target phrases; and
program instructions to output the selected particular target phrase to a text-to-speech (T2S) component implemented within the user device to cause the T2S component to output the selected particular target phrase as audible speech,
wherein the program instructions are stored on the computer readable storage medium for execution by the processor via the computer readable memory.

20. The system of claim 19, wherein the complexity level is determined based on user device activity.

* * * * *